United States Patent [19]

McCabe et al.

[11] Patent Number: 4,763,420
[45] Date of Patent: Aug. 16, 1988

[54] BASE ASSEMBLY FOR COORDINATE MEASURING MACHINE

[75] Inventors: William J. McCabe, North Kingstown; Vitaly I. Pesikov, Providence, both of R.I.

[73] Assignee: Brown & Sharpe Manufacturing Company, North Kingstown, R.I.

[21] Appl. No.: 106,614

[22] Filed: Oct. 6, 1987

[51] Int. Cl.⁴ .................. G01B 5/03; B23B 35/00
[52] U.S. Cl. ..................... 33/503; 33/1 M; 33/567; 33/125 T
[58] Field of Search ............. 33/503, 568, 567, 1 M, 33/573, 125 T, 569, 1 BB; 108/137, 138

[56] References Cited

U.S. PATENT DOCUMENTS

| | | | |
|---|---|---|---|
| 3,774,311 | 11/1973 | Stemple | 33/503 |
| 3,813,789 | 6/1974 | Shelton | 33/503 |
| 4,255,862 | 3/1981 | Nakamura | 33/503 |
| 4,360,974 | 11/1982 | de Cuissart | 33/567 |
| 4,594,791 | 6/1986 | Brandstetter | 33/503 |
| 4,630,374 | 12/1986 | Raleigh | 33/1 M |
| 4,682,418 | 7/1987 | Tuss et al. | 33/1 M |

*Primary Examiner*—William D. Martin, Jr.
*Attorney, Agent, or Firm*—Wolf, Greenfield & Sacks

[57] ABSTRACT

A base assembly for a machine tool includes a support arrangement between a metal base and a granite worktable which eliminates distortion caused by differential thermal expansion and contraction and which isolates the base from deformation due to the weight of a workpiece. The support arrangement preferably includes three spaced-apart blocks, each with a V-groove track, attached to the bottom of the granite worktable. The axes of the V-groove tracks intersect at a common point. The metal base includes three spherical projections located for engagement in each of the V-groove tracks. The support arrangement permits the granite worktable and the base to expand, contract and distort separately, while providing vertical support and lateral and rotational restraint. Several configurations of tracks and projections are disclosed.

20 Claims, 5 Drawing Sheets

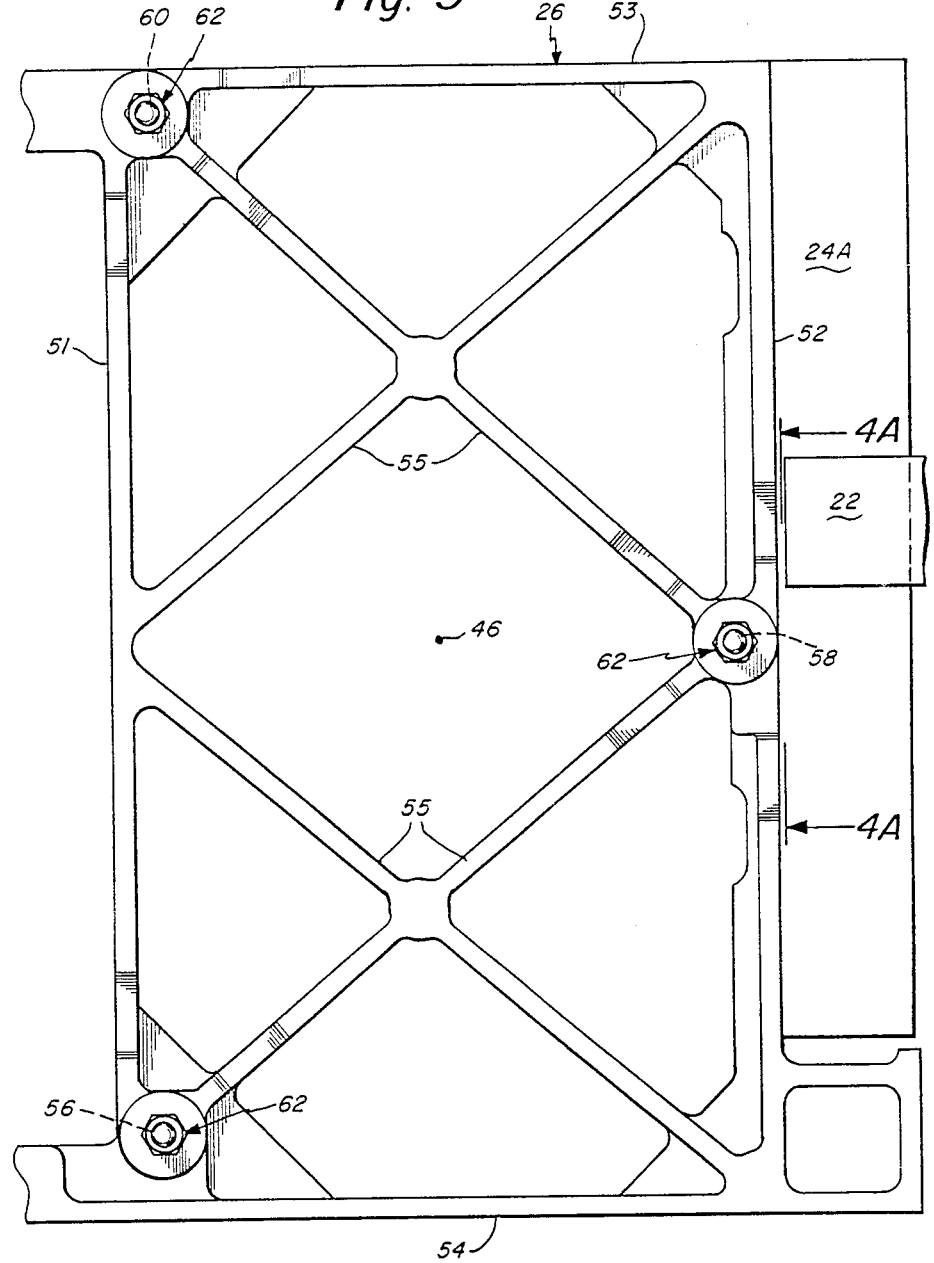

BASE ASSEMBLY FOR COORDINATE MEASURING MACHINE

FIELD OF THE INVENTION

This invention relates to a base assembly for a machine tool and, more particularly, to a base assembly including a support arrangement between a metal base and a granite worktable which eliminates distortion caused by differential expansion and contraction and which isolates the base from deformation due to the weight of the workpiece. The support arrangement permits the granite worktable and the base to expand, contract and distort separately, while providing vertical support and lateral and rotational restraint.

BACKGROUND OF THE INVENTION

Coordinate measuring machines are used for dimensional inspection of workpieces such as machine parts. A workpiece is secured to a table, and a measuring probe is secured to a movable ram. In order to measure the position of a point on the workpiece, the probe is brought into contact with the point, and the x, y and z measuring scales of the machine are read. The table for support of the workpiece is conventionally a granite block because of the stability and resistance to damage of granite. The remainder of the machine frame is typically a metal such as aluminum or steel.

One of the difficulties with a granite worktable supported by a metal base is the different temperature coefficients of granite and metal. When the coordinate measuring system undergoes temperature variations, the granite and metal elements expand or contract by different amounts, causing distortion of rigidly-connected system elements. These distortions cause errors in the measurements made with the machine and are highly undesirable. Furthermore, the granite block typically has a very long thermal time constant and takes a long time to stabilize dimensionally after a temperature change. Thus, distortions may continue over a long period of time.

A further difficulty with a granite worktable supported by a metal base is that the worktable can be deflected by the weight of the workpiece. Such deflections can be transmitted to the machine frame and cause measurement errors.

It is desirable to provide a base assembly for a coordinate measuring machine which utilizes a granite block of relatively small size to support a workpiece. The granite block must be supported by the machine base and must be stabilized against lateral and rotational movement relative to the base. Distortions caused by temperature variations, workpiece weight and other factors must be minimized. The cost and weight of the base assembly must also be minimized.

It is a general object of the present invention to provide an improved base assembly for a machine tool.

It is another object of the present invention to provide a base assembly wherein a granite block is supported by a metal base member, and support means for preventing distortion caused by differential expansion and contraction are provided between the base member and the granite block.

It is yet another object of the present invention to provide a base assembly for a coordinate measuring machine which is relatively light in weight and low in cost.

It is still another object of the present invention to provide a base assembly for a coordinate measuring machine wherein measurement errors caused by differential thermal expansion and contraction are limited.

It is a further object of the present invention to provide a base assembly for a coordinate measuring machine wherein a metal base member is isolated from worktable deflections caused by workpiece weight.

It is another object of the present invention to provide a base assembly for a coordinate measuring machine wherein a granite block is supported by a metal base member and is restrained against relative lateral and rotational movement.

SUMMARY OF THE INVENTION

According to the present invention, these and other objects and advantages are achieved in a base assembly for a machine tool comprising a first base element for support of a workpiece, the first base element having a first temperature coefficient of expansion, a second base element for support of the first base element and for support of the remainder of the machine tool, the second base element having a second temperature coefficient of expansion different from the first temperature coefficient, and isolating support means for coupling between the first base element and the second base element. The support means includes guide means attached to one of the base elements and defining three linear tracks, each having a longitudinal axis, the axes of the linear tracks intersecting or nearly intersecting a predetermined axis of the base assembly, and means defining projections attached to the other base element and positioned for engagement with and movement along each of the three linear tracks during deformation due to workpiece weight and differential thermal expansion and contraction of the first and second base elements.

Preferably, the first base element is a granite block and the second base element is a metal, such as aluminum. In a preferred embodiment of the invention, each of the linear tracks is a groove defined by a pair of flat surfaces lying in planes which intersect along a line parallel to the longitudinal axis of the track, and each of the projections has a tip portion with a generally spherical shape. The surfaces which define the linear grooves can have a variety of cross-sectional shapes. Preferably, the longitudinal axes of the tracks intersect at a common point.

The base assembly of the invention permits each base element to expand, contract and distort separately without transmitting stresses to the other base element. However, the base elements are restrained against relative translational and rotational movement.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 3 is a cross-sectional top view of the aluminum base element, taken along lines 3—3 of FIG. 1;

DETAILED DESCRIPTION OF THE INVENTION

Figure 1:
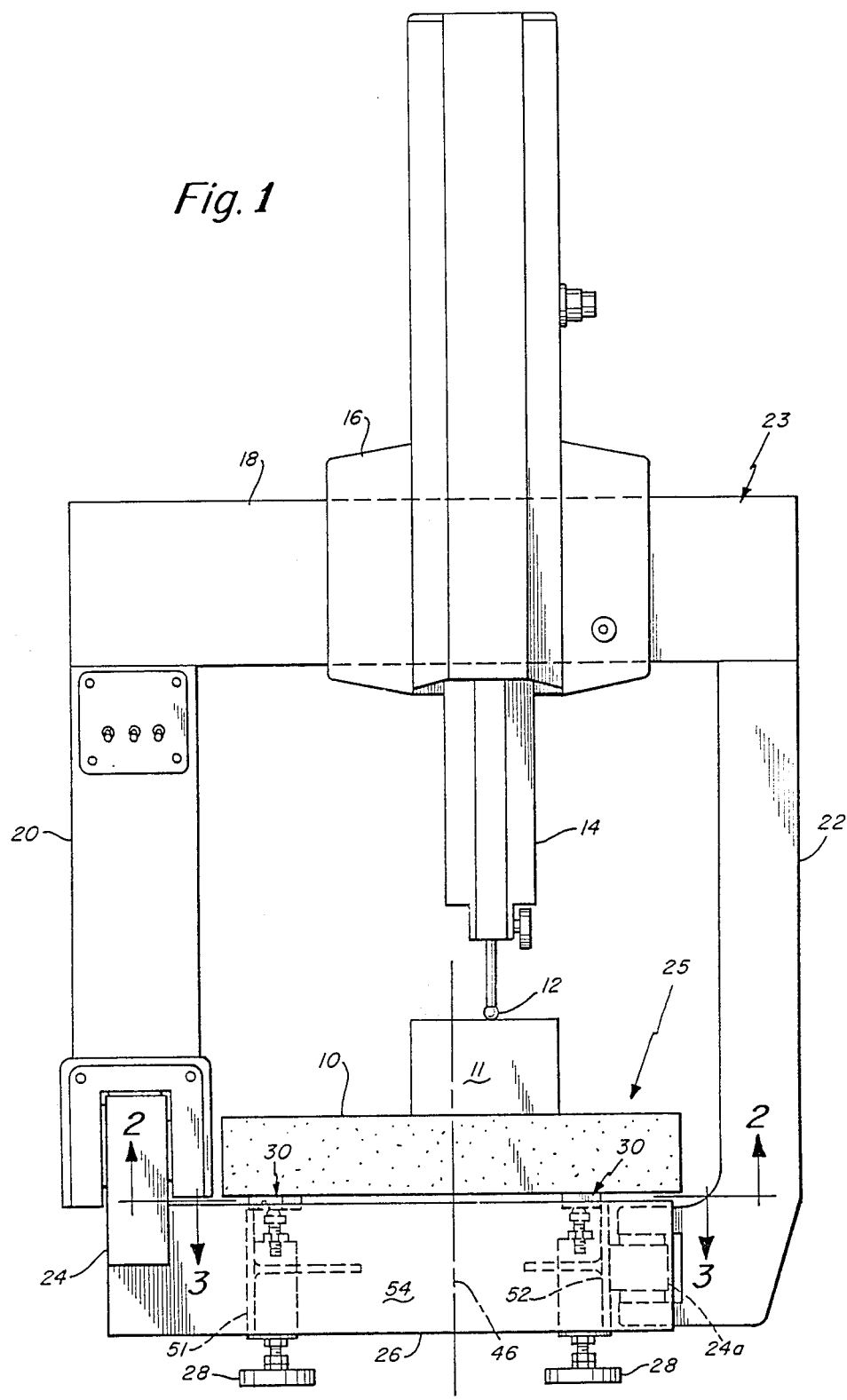
FIG. 1 is a front elevation view of a coordinate measuring machine incorporating a base assembly in accordance with the present invention.

A coordinate measuring machine incorporating a base assembly in accordance with the present invention is shown in FIG. 1. A worktable, preferably a granite block 10, supports a workpiece 11 to be measured. A movable probe 12 is brought into contact with points on the surface of the workpiece 11, and the coordinates of each point are measured by the machine. Non-contact probes such as laser or capacitive probes can also be utilized. The probe 12 is carried by a Z-rail 14. The Z-rail 14 moves vertically, or in the Z direction, through bearings in a carriage 16. The carriage 16 is movable horizontally, or in an X direction, along guideways on an X-rail 18. The X-rail 18 is carried by vertical support members 20 and 22 which together with the X-rail 18 form a bridge 23 which is movable in the Y direction along Y-rails 24 and 24a. A base assembly 25 includes a base 26, the granite block 10 and isolating support means 30 for coupling the granite block 10 to the base 26. The Y-rails 24, 24a and the bridge 23 are supported by the base 26. The entire machine is supported by feet 28 attached to the underside of base 26. A scale (not shown) is associated with each direction of movement for determining the coordinates of desired points on the workpiece.

It will be understood that the scale readings are subject to errors arising from various sources. One source of errors is machine distortions which are caused by elements of the machine expanding or contracting at different rates and by different amounts as a result of temperature variations. The granite block 10 has one temperature coefficient, typically $3.7 \times 10^{-6}$ in/in° F., while the base 26 has a second temperature coefficient. Typically, the base 26 is aluminum having a temperature coefficient of $11 \times 10^{-6}$ in/in° F. While the worktable is preferably granite, it can be made of any suitable material such as ceramic, steel, cast iron or aluminum. Another source of errors is distortion or deflection of granite block 10 caused by the weight of the workpiece. In each case, the distortions can cause stresses to be transmitted from one machine element to another and can cause undesired rail and scale deflections which introduce measurement errors.

In accordance with the present invention, the isolating support means 30 between the base 26 and the granite block 10 permits the two elements to expand and contract independently without exerting distortion-producing forces on each other. The support means 30 also permits the granite block 10 to be distorted by the weight of a workpiece without transmitting distortion-producing stresses to the base 26. The support means 30, in addition, supports the granite block 10 and the workpiece and prevents lateral and rotational movement of the granite block 10 relative to the base 26. It will be understood that the present invention prevents errors arising from stresses transmitted between granite block 10 and base 26, but does not prevent errors arising from other sources.

Figure 2:
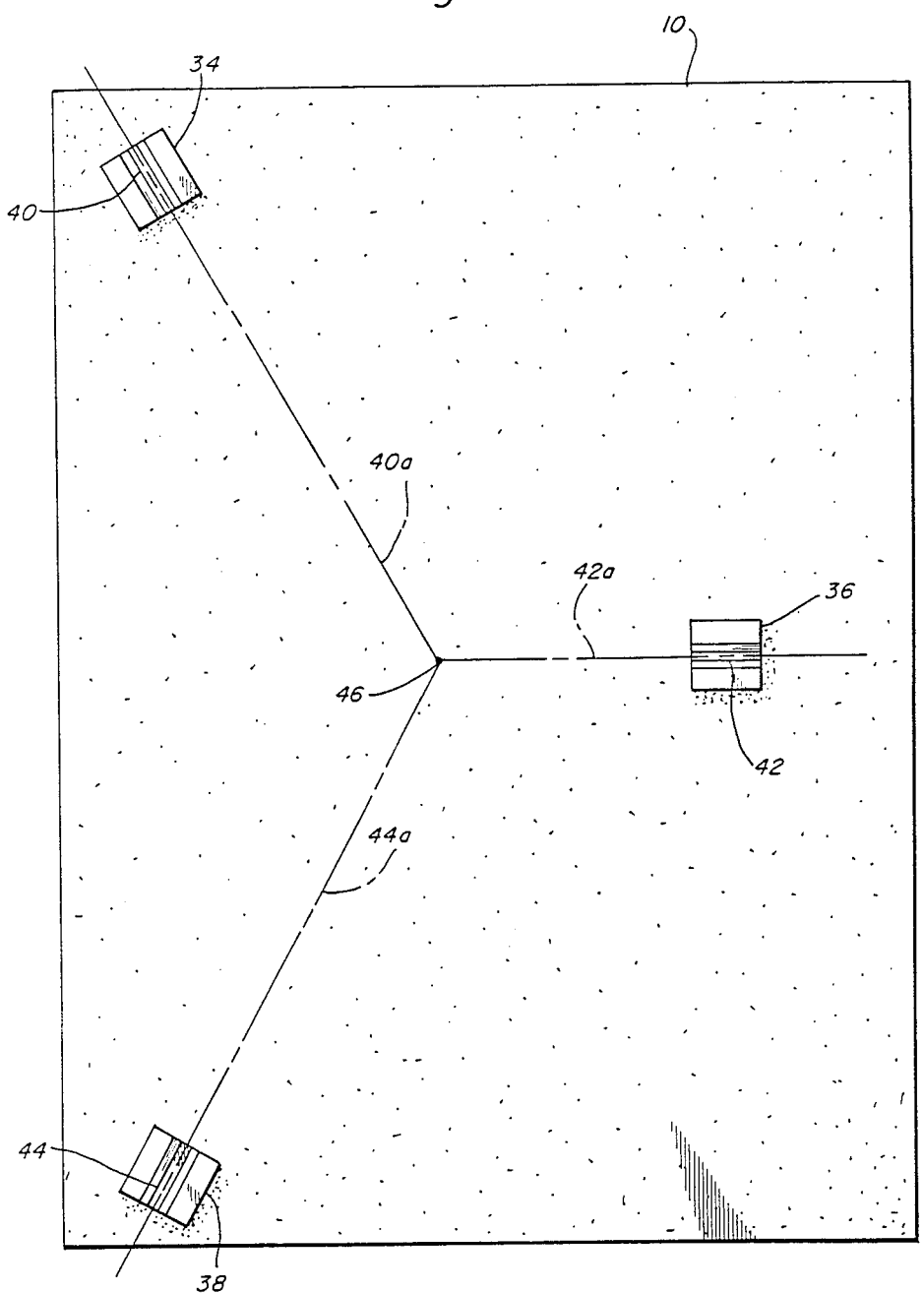
FIG. 2 is a cross-sectional bottom view, taken along lines 2—2 of FIG. 1, of a granite worktable provided with blocks having linear grooves for isolation in accordance with the present invention.

A bottom view of the granite block 10 is shown in FIG. 2. The support means 30 includes three blocks 34, 36, 38 attached to the bottom surface of the granite block 10. The blocks 34, 36, 38 have linear grooves or tracks 40, 42, 44, respectively, machined in them. The blocks 34, 36, 38 are spaced apart on the granite block 10 bottom surface and each groove 40, 42, 44 has a respective longitudinal axis 40a, 42a, 44a. The longitudinal axes 40a, 42a, 44a intersect at a predetermined axis 46. In a preferred embodiment, the predetermined axis 46 is located close to the geometric center of the granite block 10, and the blocks 34, 36, 38 are positioned so that the axes 40a, 42a, 44a are equiangularly spaced by 120°. Most preferably, the axes 40a, 42a, 44a are coplanar and intersect at a common point on the axis 46. Alternatively, the axis 46 can be located to coincide with the center of the workpiece or another point such as the origin of the workpiece. The ideal situation is to have the point of intersection of the three grooves 40, 42, 44 be the same point that the machine and scales expand from. This point should also be in the measuring volume of the machine. Then the only error will be the difference in thermal expansion of the scales and the workpiece.

A top view of the base 26 is shown in FIG. 3. Base 26 is typically an aluminum casting and includes side walls 51, 52, 53, 54 and support ribs 55. The base casting is also provided with mounting holes 56, 58, 60 which are positioned for alignment with grooves 40, 42, 44, respectively, when the machine is assembled as shown in FIG. 1.

Figure 4A:
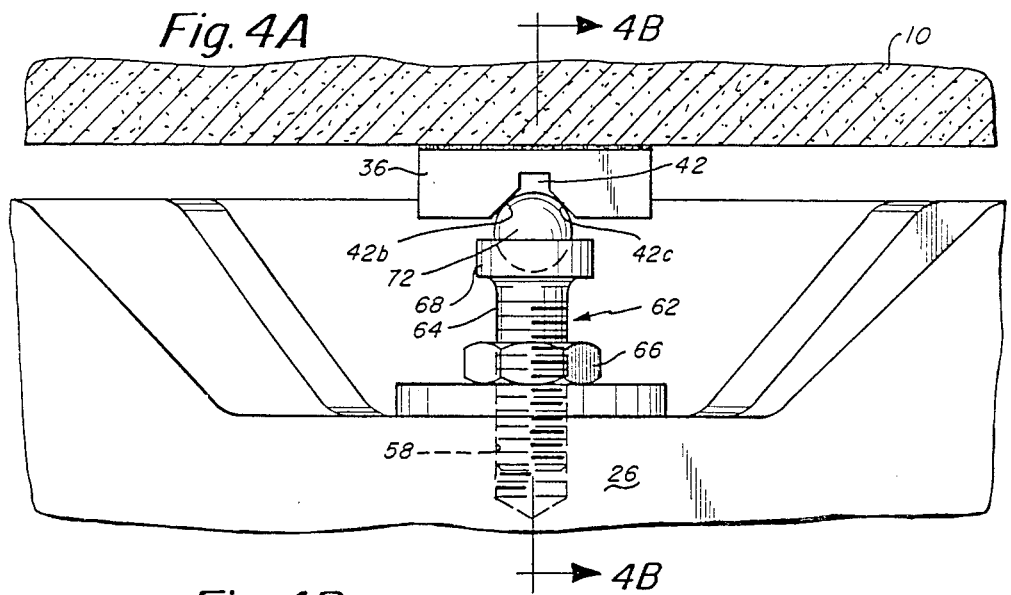
FIG. 4A is a side elevation view, taken along lines 4A—4A of FIG. 3, of a support post and ball in a linear groove as viewed along the axis of the groove.
Figure 4B:
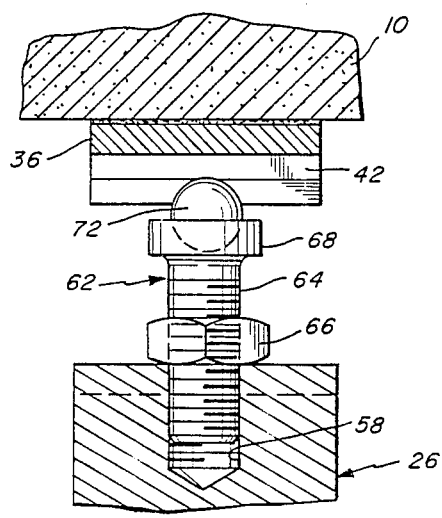
FIG. 4B is a cross-sectional view of the support post, ball and linear groove, taken along the lines 4B—4B of FIG. 4A.

The support means 30 also includes devices which are mounted in each of mounting holes 56, 58, 60 and which engage with grooves 40, 42, 44, respectively. An enlarged view of a support device 62 and block 36 is shown in FIGS. 4A and 4B. Each of the blocks 34, 36, 38 is attached to the lower surface of granite block 10 by an adhesive. The support device 62 includes a post 64 and a spherical ball 72 that forms a projection which engages with the groove 42. The post 64 has a threaded lower end engaged in mounting hole 58. A nut 66 around post 64 forms a stop when the post is threaded into mounting hole 58 and permits the height of the spherical ball 72 above the base 26 to be adjusted. The upper end of post 64 includes a flange 68 having a recess in its upper surface. The ball 72 is positioned in the recess. As noted above, the mounting holes 56, 58 and 60 are positioned for alignment with grooves 40, 42, 44, respectively, so that the ball 72 is correctly positioned for engagement with groove 40. Identical post and ball support devices 62 are positioned in mounting holes 56 and 60 for engagement with grooves 40 and 44, respectively. As described hereinafter, the balls slide in the respective grooves during expansion, contraction or other deflection or distortion of the granite block 10 and the base 26.

With reference to FIG. 2, it can be seen that as the granite block 10 expands or contracts, all points of the block move radially outwardly or inwardly with respect to predetermined axis 46. Blocks 34, 36 and 38 are carried inwardly or outwardly along the respective axes 40a, 42a and 44a, although they remain fixed to the bottom surface of block 10. Thus, as granite block 10 expands or contracts, the grooves 40, 42 and 44 remain aligned with their longitudinal axes intersecting at axis 46.

Upon expansion or contraction of the base 26 casting, the mounting holes 56, 58 and 60 move radially outwardly or inwardly with respect to axis 46. Therefore, during expansion or contraction, the balls 72 move in directions aligned with the respective longitudinal axes 40a, 42a, 44a of the grooves 40, 42, 44. However, due to the different temperature coefficients of the base 26 and the granite block 10, these two elements expand or contract by different amounts. Furthermore, since their thermal masses are likely to be different, the granite block 10 and the base 26 expand or contract for different time periods. Accordingly, during expansion or contraction of the base 26 and the granite block 10, the balls 72 slide in the respective grooves 40, 42, 44 and distortion-causing stress between the two elements is prevented.

In addition, when a relatively heavy workpiece is placed on granite block 10, the block can be deflected by a small but significant amount. This deflection will cause the balls 72 to slide in grooves 40, 42, 44 rather than distorting the base 26. Thus, there is provided effective isolation of granite block 10 and base 26 against both differential expansion and contraction and deflection caused by workpiece weight.

In a preferred embodiment, the grooves 40, 42, 44 are each defined by a pair of planar surfaces 42b and 42c as shown in FIG. 4A. The surfaces 42b and 42c lie in planes intersecting along a line parallel to the axis 42a of the respective groove 42. Preferably, the surfaces 42b and 42c have an angle therebetween of about 90°. To limit wear and prevent damage due to loading (brinelling), the points of contact between the balls 72 and the grooves 40, 42, 44 are preferably fabricated from hardened steel. Preferably, the grooves 40, 42, 44 are hardened steel, and the balls 72 are hardened stainless steel.

It will be understood that other configurations of the linear tracks, or grooves, can be provided within the scope of the present invention. All that is required is that the track, or groove, act as a linear guide along axes which intersect or nearly intersect a predetermined axis of the base. Typically, the tracks or grooves are coplanar and their longitudinal axes intersect at a common point. However, the longitudinal track axes can lie in different planes and can intersect the predetermined axis at different points, since expansion and contraction is radial to the predetermined axis. Furthermore, when the track axes do not have a common intersection but nearly intersect, some rotation and/or translation may occur. However, in some cases a small amount of rotation or translation may be acceptable, and nearly intersecting track axes can be utilized.

Figure 5A:
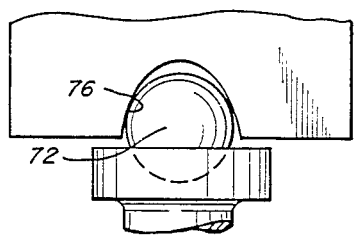
FIGS. 5A–5E illustrate other embodiments of the isolating support in accordance with the present invention.
Figure 5B:
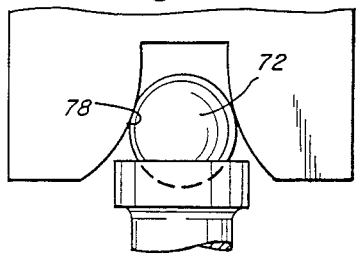
Figure 5C:
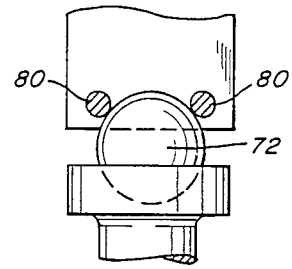
Figure 5D:
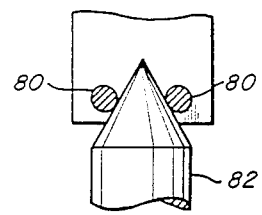
Figure 5E:
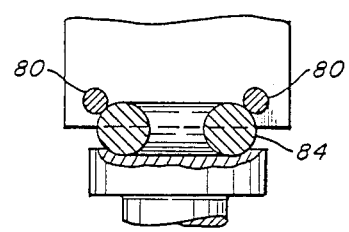

The points of contact between the ball and the track or groove define two lines parallel to the groove axis. The surfaces defining the groove can be concave surfaces 76 as shown in FIG. 5A or convex surfaces 78 as shown in FIG. 5B. Alternatively, the groove can be replaced with a pair of rods 80, as shown in FIG. 5C, parallel to the linear axis. Furthermore, while a ball provides two points of contact with the groove and does not require alignment, the sphere can be replaced by any shape, regular or irregular, which has two points of contact with the groove, such as a cone 82 as shown in FIG. 5D, an ellipse or a toroid 84 as shown in FIG. 5E. Surfaces of revolution are desired since they facilitate adjustment of the granite block height using a threaded post. Optionally, two or more balls or a cylinder can be utilized in each groove to increase the load-carrying capability of the support means. When lines of contact are used, some distortion may be transmitted to the base since the groove is not free to pivot in all directions.

While there has been shown and described what is at present considered the preferred embodiments of the present invention, it will be obvious to those skilled in the art that various changes and modifications may be made therein without departing from the scope of the invention as defined by the appended claims. For example, while the base assembly of the present invention has been described in connection with a coordinate measuring machine, it will be understood that the disclosed base assembly can be utilized in any machine tool requiring the features provided by the present invention.

What is claimed is:

1. A base assembly for a machine tool comprising:
   a first base element for support of a workpiece, said first base element having a first temperature coefficient of expansion;
   a second base element for support of said first base element and for support of the remainder of said machine tool, said second base element having a second temperature coefficient of expansion different from said first temperature coefficient; and
   isolating support means for coupling between said first base element and said second base element and including
      guide means attached to one of said base elements and defining three linear tracks, each having a longitudinal axis, the axes of said linear tracks intersecting or nearly intersecting a predetermined axis of said base assembly, and
      means defining projections attached to the other of said base elements and positioned for engagement with and movement along each of said three linear tracks during deformation due to workpiece weight and differential thermal expansion and contraction of said first and second base elements.

2. A machine tool base assembly as defined in claim 1 wherein said first base element is granite.

3. A machine tool base assembly as defined in claim 2 wherein said second base element is a metal.

4. A machine tool base assembly as defined in claim 3 wherein said second base element is aluminum.

5. A machine tool base assembly as defined in claim 1 wherein said guide means is attached to said first base element.

6. A machine tool base assembly as defined in claim 5 wherein said predetermined axis is located in a central region of said first base element.

7. A machine tool base assembly as defined in claim 6 wherein said three linear tracks are equiangularly spaced about said predetermined axis.

8. A machine tool base assembly as defined in claim 7 wherein each of said linear tracks is defined by a pair of flat surfaces lying in planes which intersect along a radial line parallel to its longitudinal axis.

9. A machine tool base assembly as defined in claim 8 wherein each of said three projections has a tip portion with a generally spherical shape.

10. A machine tool base assembly as defined in claim 8 wherein said flat surfaces defining each of said linear tracks are oriented at an angle of about 90° therebetween.

11. A machine tool base assembly as defined in claim 9 wherein the regions of contact between said tracks and said projections are fabricated from hardened steel.

12. A machine tool base assembly as defined in claim 1 wherein said linear tracks are generally V-shaped grooves.

13. A machine tool base assembly as defined in claim 5 wherein said first base element is rectangular in shape and wherein said predetermined axis is located at the center of said first base element.

14. A machine tool base assembly as defined in claim 1 wherein each of said linear tracks comprises a linear groove and each of said projections has a generally spherical tip portion which slidably engages said linear groove.

15. A machine tool base assembly as defined in claim 1 wherein the axes of said linear track are coplanar and intersect or nearly intersect at a common point.

16. A machine tool base assembly as defined in claim 1 wherein each of said linear tracks defines at least one straight line parallel to said longitudinal axis along which the respective projection moves.

17. A base assembly for a coordinate measuring machine comprising:
a granite block for support of a workpiece;
a metal base for support of said granite block and for support of the remainder of said coordinate measuring machine; and
support means for support and isolation of said granite block from said metal base, said support means including
means defining three linear grooves equiangularly spaced about a predetermined axis and attached to one of said granite block and said metal base, each of said linear grooves having a longitudinal axis which intersects or nearly intersects said predetermined axis, and
means defining three projections attached to the other of said granite block and said metal base for sliding movement in said three linear grooves, respectively, during expansion and contraction caused by ambient temperature variation and deformation due to workpiece weight.

18. A base assembly as defined in claim 17 wherein said granite block is a rectangular slab having a bottom surface wherein said groove-defining means comprises three blocks attached to the bottom surface of said granite block, each block having one of said linear grooves therein.

19. A base assembly as defined in claim 18 wherein said projection-defining means comprises three projection assemblies, each comprising a post threaded at one end into said metal base and having a generally spherical ball attached at the other end.

20. A base assembly for a machine tool comprising:
a first base element for support of a workpiece;
a second base element for support of said first base element; and
support means for coupling between said first base element and said second base element and including
guide means attached to one of said base elements and defining three linear tracks, each having a longitudinal axis, the axes of said linear tracks intersecting or nearly intersecting a predetermined axis of said base assembly, and
means defining projections attached to the other of said base elements and positioned for engagement with and movement along each of said three linear tracks.

* * * * *